United States Patent
Yoo et al.

(10) Patent No.: US 9,960,830 B2
(45) Date of Patent: May 1, 2018

(54) METHOD AND APPARATUS FOR MANAGING BEAM IN BEAMFORMING SYSTEM

(71) Applicant: Samsung Electronics Co., Ltd., Suwon-si, Gyeonggi-do (KR)

(72) Inventors: Hyunil Yoo, Suwon-si (KR); Jaewon Kim, Seoul (KR); Jeehwan Noh, Suwon-si (KR); Hyunseok Ryu, Yongin-si (KR); Hyukmin Son, Hanam-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/477,567

(22) Filed: Apr. 3, 2017

(65) Prior Publication Data

US 2017/0288763 A1    Oct. 5, 2017

Related U.S. Application Data

(60) Provisional application No. 62/317,943, filed on Apr. 4, 2016.

(30) Foreign Application Priority Data

Jan. 23, 2017   (KR) ........................ 10-2017-0010456

(51) Int. Cl.
*H04B 1/18* (2006.01)
*H04B 7/06* (2006.01)
(Continued)

(52) U.S. Cl.
CPC ............. *H04B 7/0695* (2013.01); *H01Q 3/10* (2013.01); *H01Q 3/30* (2013.01); *H04B 7/0628* (2013.01);
(Continued)

(58) Field of Classification Search
CPC ... H04B 7/0695; H04B 7/0628; H04W 16/28; H04W 72/046; H04W 72/085; H04W 84/18
See application file for complete search history.

(56) References Cited

U.S. PATENT DOCUMENTS 9,729,219 B2 *   8/2017   Chapman ............. H04B 7/0617
9,800,304 B2 *  10/2017   Kim ..................... H04B 7/0417
(Continued)

FOREIGN PATENT DOCUMENTS

KR   10-2015-0024333 A   3/2015
KR      10-1563469 B1    10/2015
(Continued)

OTHER PUBLICATIONS

LG Electronics', Further details on uplink transmissions for NB-IoT, R1-160621, 3GPP TSG RAN1 #84, St. Julian's, Malta Feb. 15-19, 2016.
(Continued)

*Primary Examiner* — Tuan Pham
(74) *Attorney, Agent, or Firm* — Jefferson IP Law, LLP

(57) ABSTRACT

A pre-5th-generation (5G) or 5G communication system for supporting higher data rates Beyond 4th-generation (4G) communication system such as long term evolution (LTE) is provided. In a beam update method of a terminal, measuring a beam reference signal (BRS) transmitted from a base station, determining whether a beam measurement information transmission condition is satisfied, if the beam measurement information transmission condition is satisfied, transmitting beam measurement information to the base station, receiving information about a base station transmitting beam from the base station, and updating information about a terminal receiving beam based on the received information about the base station transmitting beam.

10 Claims, 12 Drawing Sheets

(51) Int. Cl.
  *H01Q 3/10*  (2006.01)
  *H01Q 3/30*  (2006.01)
  *H04L 29/08*  (2006.01)
  *H04W 16/28*  (2009.01)
  *H04W 72/04*  (2009.01)
  *H04W 72/08*  (2009.01)
  *H04W 84/18*  (2009.01)

(52) U.S. Cl.
  CPC ....... *H04L 29/08315* (2013.01); *H04W 16/28* (2013.01); *H04W 72/046* (2013.01); *H04W 72/085* (2013.01); *H04W 84/18* (2013.01)

(56) References Cited

U.S. PATENT DOCUMENTS

| | | |
|---|---|---|
| 2012/0163326 A1 | 6/2012 | Lee et al. |
| 2013/0072243 A1 | 3/2013 | Yu et al. |
| 2013/0121185 A1 | 5/2013 | Li et al. |
| 2013/0172002 A1* | 7/2013 | Yu ............... H04W 72/046 455/452.1 |
| 2014/0126520 A1 | 5/2014 | Quan et al. |
| 2015/0063179 A1 | 3/2015 | Yang et al. |
| 2015/0208443 A1 | 7/2015 | Jung et al. |
| 2015/0237619 A1 | 8/2015 | Yang et al. |
| 2015/0341878 A1 | 11/2015 | Lee et al. |
| 2016/0156454 A1 | 6/2016 | Khoryaev et al. |
| 2016/0157267 A1 | 6/2016 | Frenne et al. |
| 2016/0337916 A1 | 11/2016 | Deenoo et al. |
| 2017/0214444 A1 | 7/2017 | Nigam et al. |

FOREIGN PATENT DOCUMENTS

| | | |
|---|---|---|
| KR | 10-2016-0015821 A | 2/2016 |
| WO | 2014/027868 A1 | 2/2014 |
| WO | 2015/109153 A1 | 7/2015 |
| WO | 2015/147717 A1 | 10/2015 |

OTHER PUBLICATIONS

ZTE', UCI transmission for NB-IoT, R1-161871, 3GPP TSG RAN WG1 NB-IoT Ad-Hoc Meeting, Sophia Antipoils, France, Mar. 22-24, 2016.

Huawei, Hisilicon', UCI for NB-IoT, R1-161808, 3GPP TSG RAN WG1 NB-IoT Ad-Hoc Meeting #2, Sophia-Antipoils, France, Mar. 22-24, 2016.

* cited by examiner

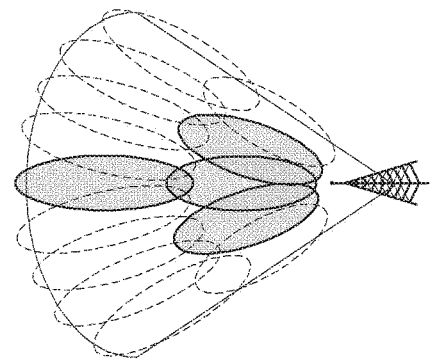
FIG. 3C
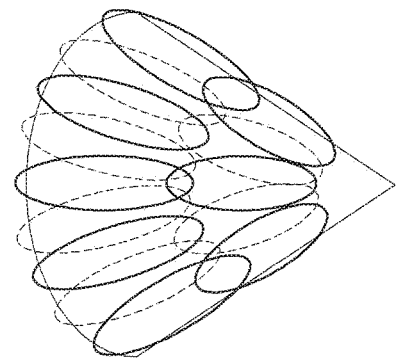
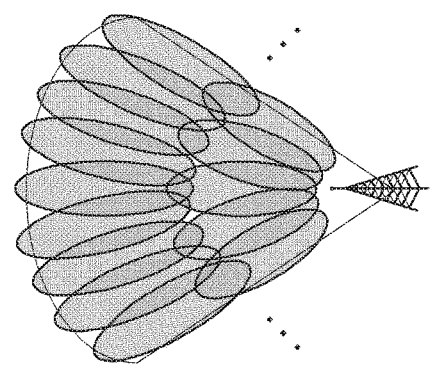
FIG. 3B
FIG. 3A

METHOD AND APPARATUS FOR MANAGING BEAM IN BEAMFORMING SYSTEM

CROSS-REFERENCE TO RELATED APPLICATION(S)

This application claims the benefit under 35 U.S.C. § 119(e) of a U.S. Provisional application filed on Apr. 4, 2016 in the U.S. Patent and Trademark Office and assigned Ser. No. 62/317,943, and under 35 U.S.C. § 119(a) of a Korean patent application filed on Jan. 23, 2017 in the Korean Intellectual Property Office and assigned Serial number 10-2017-0010456, the entire disclosure of each of which is hereby incorporated by reference.

TECHNICAL FIELD

The present disclosure relates to a method and apparatus for managing a beam, especially, updating a beam, in a beamforming system.

BACKGROUND

To meet the demand for wireless data traffic that has increased since deployment of $4^{th}$-generation (4G) communication systems, efforts have been made to develop an improved $5^{th}$-generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an improved beam management method and apparatus.

Another aspect of the present disclosure is to provide a method and apparatus for updating a beam in a beamforming system.

In accordance with an aspect of the present disclosure, a beam update method of a terminal is provided. The beam update method includes measuring a beam reference signal (BRS) transmitted from a base station, determining whether a beam measurement information transmission condition is satisfied, if the beam measurement information transmission condition is satisfied, transmitting beam measurement information to the base station, receiving information about a base station transmitting beam from the base station, and updating information about a terminal receiving beam based on the received information about the base station transmitting beam.

In accordance with another aspect of the present disclosure, a beam update method of a base station is provided. The beam update method includes setting a beam measurement information transmission condition to a terminal, transmitting a BRS to the terminal, receiving beam measurement information from the terminal, and determining a base station transmitting beam based on the beam measurement information.

In accordance with another aspect of the present disclosure, a terminal is provided. The terminal includes a transceiver configured to transmit or receive a signal, and at least one processor configured to measure a BRS transmitted from a base station, determine whether a beam measurement information transmission condition is satisfied, if the beam measurement information transmission condition is satisfied, control the transceiver to transmit beam measurement information to the base station, control the transceiver to receive information about a base station transmitting beam from the base station, and update information about a terminal receiving beam based on the received information about the base station transmitting beam.

In accordance with another aspect of the present disclosure, a base station is provided. The base station includes a transceiver configured to transmit or receive a signal, and at least one processor configured to set a beam measurement information transmission condition to a terminal, control the transceiver to transmit a BRS to the terminal, control the transceiver to receive beam measurement information from the terminal, and determine a base station transmitting beam based on the beam measurement information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, and 3C are diagrams illustrating a method for managing an RS according to an embodiment of the present disclosure;

Throughout the drawings, it should be noted that like reference numbers are used to depict the same or similar elements, features, and structures.

DETAILED DESCRIPTION

Figure 1:
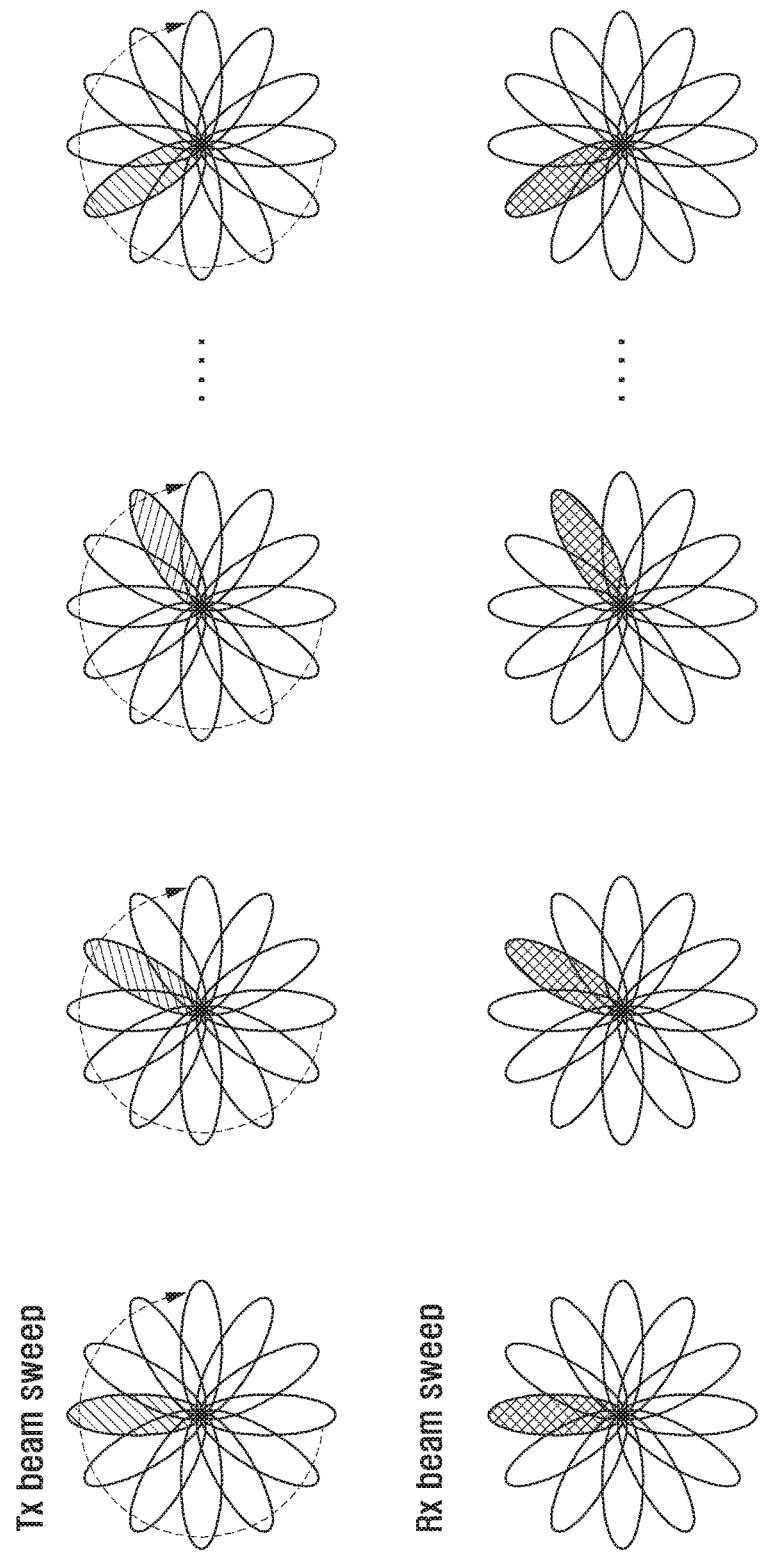
FIG. 1 is a diagram illustrating a beamforming operation in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, terms are defined in consideration of functions of this disclosure and may be varied depending on user or operator's intention or custom. Therefore, the definition should be made based on the contents throughout this description. For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

In the $5^{the}$ generation (5G) communication system based on beamforming, beam management techniques are very important. Namely, beam selection, beam update, beam refinement, and the like are required. In embodiments of the present disclosure, a beam update method including periodic/aperiodic beam selection among such beam management techniques will be described below.

In embodiments of the present disclosure, a beam currently used for communication by a terminal and a base station may be referred to as a serving beam.

Additionally, in embodiments of the present disclosure, a first type reference signal and/or a second type reference signal may be referred to as a beam reference signal (BRS), which may be a RS for beam selection and update transmitted to terminal by a base station.

FIG. 1 is a diagram illustrating a beamforming operation in a wireless communication system according to an embodiment of the present disclosure.

Referring to FIG. 1, the wireless communication system includes a plurality of nodes (e.g., a base station and a plurality of terminals), and one node may find an optimal beam for wireless communication with a counterpart node and then set the optimal beam so as to transmit and receive data. In an embodiment, at least one of analog beamforming and digital beamforming may be applied for beamforming. The analog beamforming may be performed by adjusting the shape and direction of a beam by using a difference in amplitude and phase of a carrier signal in a radio frequency (RF) band. The digital beamforming may process a signal by applying each weight vector to a digitized signal, so that an RF signal from each antenna is passed to a digital band through a separate RF transceiver. The digital beamforming may realize beamforming through digital signal processing, and thus generate a sophisticated beam that meets a demand for communication according to signal processing capability.

Each node may form a transmitting (Tx) beam and a receiving (Rx) beam. In order for each node to find a suitable beam for communication, a full beam sweep may be performed with regard to all of the Tx beams and the Rx beams as shown in FIG. 1. A process of finding an optimal beam for a counterpart node may be referred to as beam searching, and an associated RS may be transmitted and received for this process.

In embodiments, the RS may include a cell-specific RS and a terminal-specific RS, each of which may be transmitted periodically or aperiodically. As examples of the reference signal, there are a BRS and a beam refinement reference signal (BRRS).

In an embodiment, the BRS may be a cell-specific RS and be transmitted periodically. Also, in an embodiment, the BRRS may be a terminal-specific RS and be transmitted aperiodically. In another embodiment, the BRRS is a terminal-specific reference signal, and the allocation of the BRRS may be static or semi-static. In this case, the BRRS may be transmitted periodically or aperiodically within an allocated period.

In an embodiment, the terminal may measure at least one of the BRS and the BRRS transmitted from the base station and then report information about specific beams among them to the base station. This information reported to the base station may include at least one of the followings.

BRS-based beam state information (BSI): A beam index (BI) of a beam and quality information of a beam (i.e., beam reference signal received power (BRSRP), beam reference signal quality (BRSRQ), and beam received signal strength indicator (BRSSI))

BRRS-based beam refinement information (BRI): a BRRS resource index (BRRS-RI) for identifying a BRRS beam and quality information of a beam (for example, BRRS received power (BRRS-RP))

Figure 2:
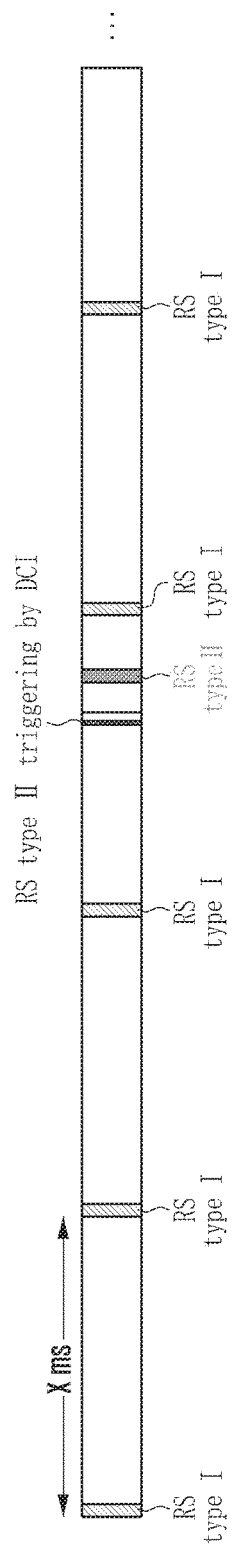
FIG. 2 is a diagram illustrating a frame with two types of reference signals (RSs) according to an embodiment of the present disclosure.

FIG. 2 is a diagram illustrating a frame with two types of RSs according to an embodiment of the present disclosure.

Referring to FIG. 2, two types of RSs are used. In the 5G communication system based on beamforming, a RS is needed for a beam operation. In embodiments of the present disclosure, an RS is used for a beam operation and may be referred to as a BRS. The terminal receives an RS for a beam operation and performs beam selection, beam update, and beam refinement. For such a beam operation, an RS should be transmitted from the base station to the terminal. In embodiments of the present disclosure, two types of RSs, i.e., the first type RS (RS type I) and the second type RS (RS type II), may be used. At least two types of RSs may be used, and the type of RS is not limited to two.

The first type RS may be an RS for a periodic beam operation. The second type RS may be an RS for an aperiodic beam operation. Alternatively, the first type RS may be operated aperiodically, and the second type RS may be operated periodically.

The first type RS may be a cell-specific RS, e.g., BRS. The second type RS may be a terminal-specific RS, e.g., BRRS. However, the first type RS is not limited to a cell-specific RS, and the second type RS is not limited to a terminal-specific RS.

In embodiments, a new RS (i.e., a beam RS) may be defined as the first type RS or any existing RS (e.g., channel state information-reference signal (CSI-RS) or demodulation reference signals (DMRS)) may be reused as the first type RS.

First, a synchronization signal (a primary synchronization signal (PSS) or a secondary synchronization signal (SSS)) or a broadcast channel (BCH) may be used as the first type RS. In this case, such an existing signal may be designed in view of beam measurement. For example, in FIG. 2, the period (X ms) of the first type RS may be configured to have the same period as that of the synchronization signal or the BCH.

Second, in a case where a newly defined RS is used, this signal may be designed to be used at the initial access of the terminal. Namely, for transmission, this signal may be multiplexed with a synchronization signal or a BCH having a regular period on the basis of time and frequency.

Third, in a case where the existing RS is reused, a CSI-RS or a DMRS may be used. The CSI-RS may use, as configuration for beam measurement, configuration for class AB defined in full dimension multi-input multi-output (FD-MIMO). Namely, this signal may use, as configuration for each beam, resource configuration according to K values. In this case, through upper layer signaling, the K value informs the terminal how many symbols are used for transmission of CSI-RS.

Since the first type RS may not be used for all beams, the second type RS is required and may be transmitted aperiodically. The second type RS may be sent when needed by the terminal or the base station.

Referring to FIG. 2, the first type RS (i.e., RS type I) may be transmitted, for example, periodically. The first type RS may be transmitted periodically at intervals of X ms, which may correspond to the length of subframe. Referring to FIG. 2, the second type RS (i.e., RS type II) may be transmitted, for example, aperiodically. In this case, the second type RS may be transmitted by a trigger of the base station. For example, the second type RS may be triggered by downlink control information (DCI). After a predetermined time from a time point of receiving DCI, or at a specific time point indicated by DCI, the base station may transmit the second type RS and the terminal may receive the second type RS. As shown in FIG. 2, the second type RS may be triggered by DCI. At the n-th subframe, for example, the terminal may detect, from DCI, an indicator that indicates transmission of the second type RS. When the indicator is detected, the terminal may perform a beam measurement process using the second type RS at the (n+k)-th subframe. In this case, the K value may be notified to the terminal by the base station through an upper layer signal or DCI.

The first type RS may be transmitted aperiodically. Alternatively, while being transmitted periodically, the first type RS may be transmitted aperiodically in response to a trigger of the base station. The second type RS may be transmitted periodically.

The reason that two kinds of RSs are used in embodiments is that a beam operating process may be divided into two operations when the base station and the terminal employ many beams or when there is difficulty in operating a beam by using only a periodic or aperiodic RS. The first type RS may be a beam transmitted in a relatively wide band, and the second type RS may be a beam transmitted in a relatively narrow band. For example, a region or beam region of the first type RS having a good beam status may be identified using the first type RS with a wide band, and the second type RS with a narrow band may be used in a beam or region corresponding to the identified beam or region. This makes it possible to operate the beam more efficiently than using narrow band RSs in all regions. Because of being a beam having a wide band, the first type RS may be not suitable for data communication in high frequency communication. In contrast, the second type RS which may be a fine beam having a narrow band may be suitable for performing data communication in high frequency communication because a beam band is narrow.

FIGS. 3A, 3B, and 3C are diagrams illustrating a method for managing a RS according to an embodiment of the present disclosure.

Referring to FIG. 3A a full beam set is illustrated. To operate beams by using both the first type RS and the second type RS for the full beam set may burden the network with an overload. Assuming that the total number of beams is N, the number N may be very large, and in this case, a procedure for performing beam selection and beam refinement may take a very long time. Therefore, a method for reducing a beam operating procedure time is required.

In embodiments, since the terminal should select and use the best or higher quality beam during communication with the base station, the terminal may perform a beam management process using the first type RS and then, using the second type RS based on a beam selected through the first type RS, perform a process of selecting again a neighboring beam.

Referring to FIG. 3B, an example of operating the first type RS is illustrated. The base station may operate the first type RS, and the terminal may measure a plurality of first type RSs and feedback the result of beam measurement. As the result of feedback, some beams may be determined as good beams that satisfy a predetermined quality.

Referring to FIG. 3C, an example of operating the second type RS is illustrated. The second type RS may be operated using the measurement result of the first type RS. The highlighted portion in FIG. 3C may be a region corresponding to a beam of good quality as the result of the first type RS measurement. The base station may operate the second type RS in the beam region of good quality as the result of the first type RS measurement. The second type RS may be measured to transmit beam feedback information, and the base station may receive the beam feedback information from the terminal and determine a beam. The beam may be selected by the terminal, and the terminal may notify the result of beam selection to the base station.

Meanwhile, when two types of RSs are operated, a problem may occur depending on a method of updating the beam.

Figure 4:
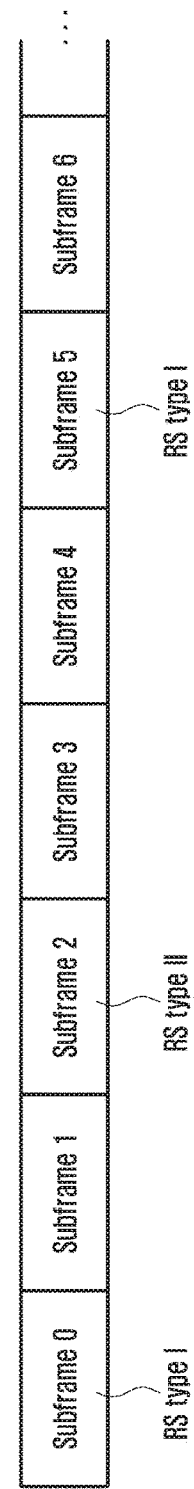
FIG. 4 is a diagram illustrating a frame structure for transmission of first and second RSs according to an embodiment of the present disclosure.

FIG. 4 is a diagram illustrating a frame structure for transmission of first and second RSs according to an embodiment of the present disclosure.

Referring to FIG. 4, it is assumed that the first type RS is transmitted periodically, for example. (However, the first type RS is not limited to periodical transmission.) As described in the above embodiment, it is assumed that the terminal and the base station select beams by using the first type RS transmitted periodically and further select beams by using the second type RS. For example, it is assumed that the first type RS is transmitted for every five subframes.

The base station may transmit the first type RS to the terminal at intervals of five subframes. The transmission period of the first type RS may be five subframe intervals. Namely, the base station may transmit the first type RS at subframe 0 and transmit again the first type RS at subframe 5 after five subframes. The terminal may receive the first type RS at subframe 0 and then receive the first type RS at subframe 5. The base station may transmit the second type RS at subframe 2, and the terminal may receive the second type RS at subframe 2.

In this case, the terminal may select a beam by using the first type RS at subframe 0 and notify this to the base station. Alternatively, the terminal may transmit only a beam feedback value for the first type RS to the base station, and then the base station may select a beam and notify a selection result to the terminal. Based on the beam selected in the above manner, the base station may transmit the second type RS. Referring to FIG. 4, the base station transmits the second type RS to the terminal at subframe 2. Using the second type RS, the terminal and the base station select a beam having better quality. The beam selected using the second type RS may be a detailed beam.

Since it is assumed that the first type RS is periodically transmitted, the process of beam measurement and beam selection is performed again using the first type RS transmitted at subframe 5 even though a suitable beam is selected using the second type RS at subframe 2. In this case, although the best quality beam is selected using the second type RS, a beam is updated again using the first type RS. Unfortunately, this may result in selecting/updating a beam having a lower quality than that of the beam selected using the second type RS.

Figure 5:
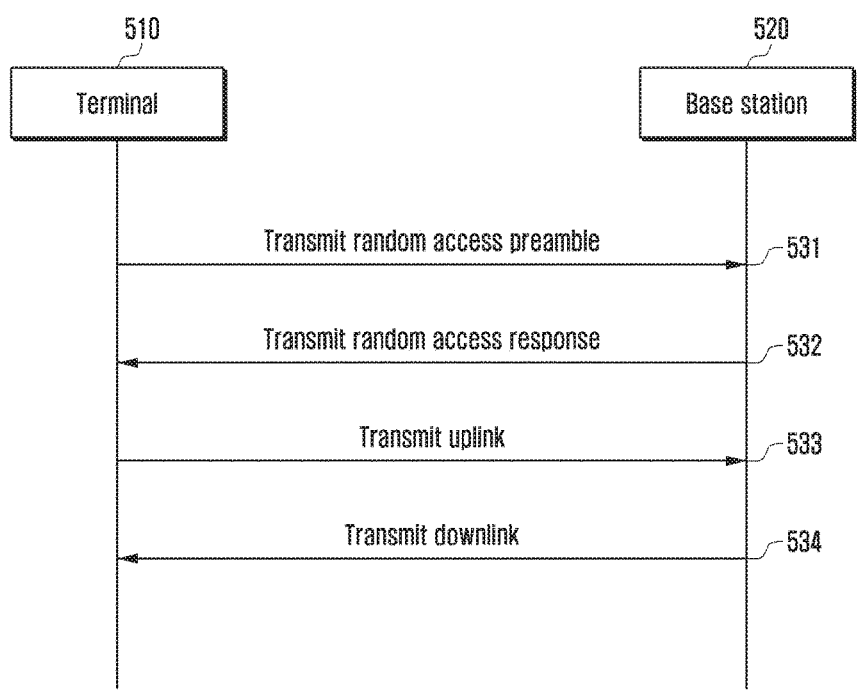
FIG. 5 is a diagram illustrating a method for updating a beam by using random access resources according to an embodiment of the present disclosure.

FIG. 5 is a diagram illustrating a method for updating a beam by using random access resources according to an embodiment of the present disclosure.

Referring to FIG. 5, a beam may be updated using random access resources. A message used in a random access procedure is as follows.

Message 1 (MSG1): Transmission of a random access preamble by the terminal through a random access channel (RACH)

Message 2 (MSG2): Transmission of a random access response by the base station through a physical downlink control channel (PDCCH)

Message 3 (MSG3): Transmission of a buffer status report (BSR), uplink information, or beam feedback information by the terminal through a physical uplink shared channel (PUSCH)

Message 4 (MSG4): Transmission of contention resolution by the base station through the PDCCH In embodiments, the terminal may perform an RACH procedure when performing initial cell access, performing cell access after occurrence of radio link failure (RLF), performing access in a target cell in case of handover, performing beam recovery in case of beam misalignment, or performing cell access in an idle mode due to paging reception or generation of uplink data.

Hereinafter, an operation of performing the RACH procedure when the terminal performs the initial cell access will be described as an example.

It is assumed in this embodiment that beam reciprocity may be realized. The beam reciprocity indicates the ability to use the Tx beam as the Rx beam and vice versa. Specifically, when the beam reciprocity is established, the Tx beam corresponding to the Rx beam of the terminal may be used as the Tx beam of the terminal, and also the Rx beam corresponding to the Tx beam of the terminal may be used as the Rx beam of the terminal. Similarly, when the beam reciprocity is established, the Tx beam corresponding to the Rx beam of the base station may be used as the Tx beam of the base station, and also the Rx beam corresponding to the Tx beam of the base station may be used as the Rx beam of the base station. When the terminal transmits and receives a signal through a beam, a beam identifier may be contained to identify the Tx beam or the Rx beam.

At operation 531, the terminal 510 may transmit a random access preamble to the base station 520. At operation 532, the base station 520 may transmit a random access response to the terminal 510 in response to the random access preamble received from the terminal 510.

At operation 533, the terminal 510 may transmit the MSG3. The MSG3 is a response to the random access response and may be the first uplink transmission after receiving the random access response. The MSG3 may include information about beam feedback. In addition, a beam that implicitly transmits or receives the MSG3 may be indicated as a beam selected by the terminal 510.

When transmitting the MSG3, the terminal 510 may use the Tx beam used in the MSG1. The MSG3 is transmitted after receiving the MSG2. The reception of the MSG2 by the terminal 510 means that the transmission of the MSG1 has succeeded and that the Tx beam used in the MSG1 is valid. In addition, the Tx beam for the MSG3 may be estimated in a procedure of receiving the MSG1 by the base station 520 and instructed to the terminal 510 through the MSG2. When receiving the MSG3, the base station 520 may use the same Rx beam as a beam for receiving the MSG1. The base station 520 may receive the MSG3 and then estimate the Tx beam transmitted by the terminal 510.

At operation 534, the base station 520 transmits the MSG4 as the Tx beam. The Rx beam of the terminal 510 receiving the MSG4 may use the Rx beam corresponding to the Tx beam that transmits the MSG3.

The beam selection and beam update may be performed as discussed above.

Figure 6:
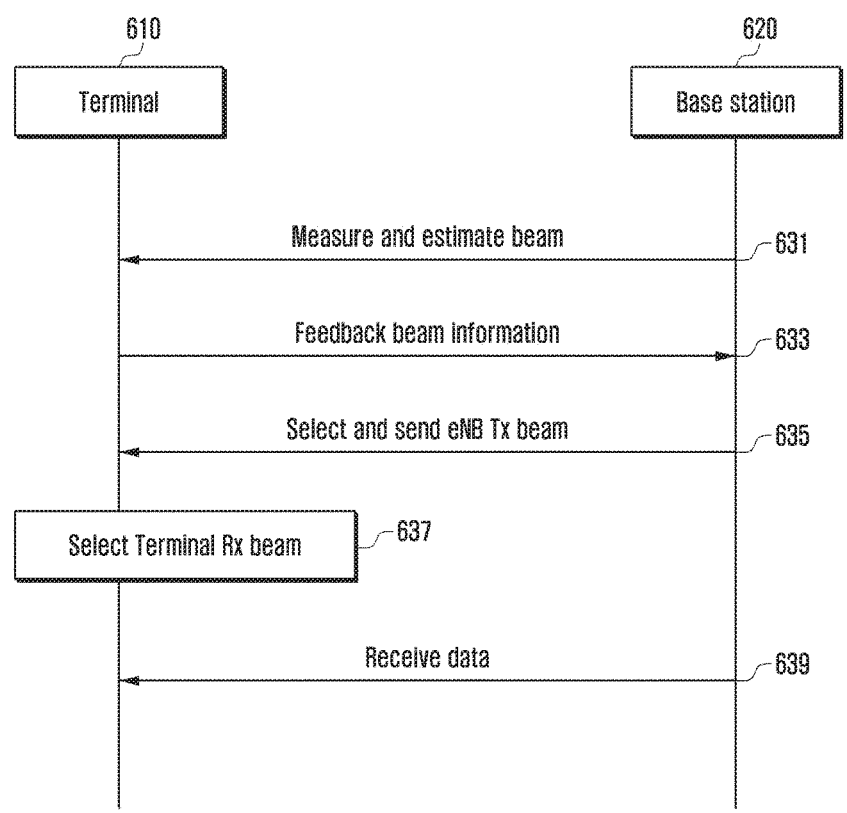
FIG. 6 is a diagram illustrating a beam update procedure in a connected state according to an embodiment of the present disclosure.

FIG. 6 is a diagram illustrating a beam update procedure in a connected state according to an embodiment of the present disclosure.

Referring to FIG. 6, at operation 631, the terminal 610 may measure beams and estimate a beam of good quality. For example, the first type RS and the second type RS, described above, may be used to measure and estimate the beam.

At operation 633, the terminal 610 may feedback beam information to the base station 620. The terminal 610 may transmit information about the terminal Tx beam through the PUCCH. This information about the terminal Tx beam may be information about the Tx beam of the terminal 610 corresponding to a base station Tx beam identifier indicated by the base station 620 via the PDCCH. The information about the terminal Tx beam may be information of a candidate group for a plurality of beams. The candidate group information may include a plurality of beam identifiers. At operation 633, the base station 620 may receive beam information. Using the Rx beam corresponding to the base station Tx beam identifier, the base station 620 may receive the beam information transmitted by the terminal 610.

At operation 635, the base station 620 may select the base station Tx beam identifier and transmit information about the selected Tx beam identifier to the terminal 610. The base station 620 may select at least one of a plurality of base station Tx beams, based on information received via the PUCCH from the terminal 610, and transmit information about the selected base station Tx beam to the terminal 610. For example, the base station 620 may transmit the Tx beam for the terminal, estimated through the beam management process, to the terminal 610 through the PDCCH. The terminal 610 may receive information about the base station Tx beam from the base station 620. The base station 620 may determine the selected base station Tx beam as the Tx beam for the terminal 610 and, when transmitting data to the terminal, use it as the Tx beam.

At operation 635, the base station 620 may transmit the PDCCH so as to transmit data through the PDSCH. Control information transmitted through the PDCCH may include Tx beam information of the base station. Assuming that the subframe at which the PDCCH is transmitted is the n-th subframe, the same Tx beam may be applied to the PDCCH and the PDSCH transmitted at the n-th subframe. Information about the base station Tx beam transmitted through the PDCCH may be information about the Tx beam for PDSCH reception at the (n+k)-th subframe. The terminal 610 may detect information about the base station Tx beam transmitted at the n-th subframe and use it for receiving the PDCCH/PDSCH with the Rx beam corresponding to the Tx beam of the base station at the (n+k)-th subframe.

At operation 637, the terminal 610 may select a terminal Rx beam, based on information about the base station Tx beam received from the base station 620. The Rx beam selected by the terminal 610 may be the Rx beam for receiving data via the PDSCH. The terminal 610 may estimate that the base station 620 transmits the PDSCH by using the base station Tx beam corresponding to the terminal Rx beam.

At operation 639, the base station 620 may transmit data through the PDSCH with the selected Tx beam, and the terminal 610 may receive data through the PDSCH with the selected Rx beam.

As described above, operations such as beam measurement, beam selection, and data transmission/reception through the selected beam may be performed in the connected state.

Various conditions under which the terminal performs beam feedback or beam update will be described below. The beam feedback and beam update method to be described below is applicable to the embodiments of FIGS. 5 and 6. At least one of the following beam update methods may be preset in the terminal by the base station.

Figure 7:
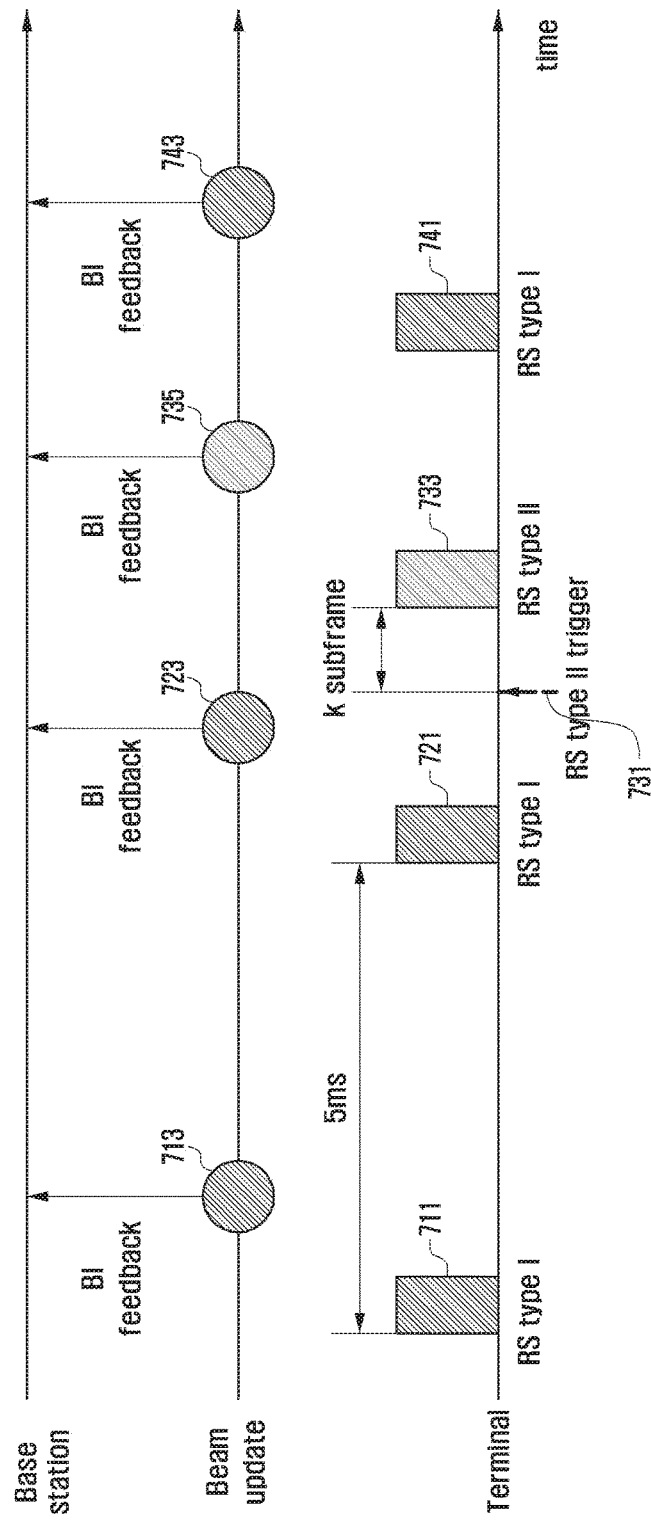
FIG. 7 is a diagram illustrating a beam update method according to an embodiment of the present disclosure.

FIG. 7 is a diagram illustrating a beam update method according to an embodiment of the present disclosure.

Referring to FIG. 7, at operation 711, the terminal may measure the first type RS. The terminal may measure a beam quality indicator (BQI). The BQI may be measured for each beam pair. The beam pair may be a pair relationship between the base station Tx beam and the terminal Rx beam.

The BQI may be measured through the following Equations 1 and 2.

$$BQI_{RStypeI} = \frac{\text{Signal strength of } RS \text{ type } I}{\text{Interference from neighboring beam} + \text{Noise}} \quad \text{Equation 1}$$

$$BQI_{RStypeII} = \frac{\text{Signal strength of } RS \text{ type } II}{\text{Interference from neighboring beam} + \text{Noise}} \quad \text{Equation 2}$$

The terminal may measure a beam quality by applying Equation 1 to the first type RS and applying Equation 2 to the second type RS, and this may be contained in a measurement result. The measurement result may include a beam quality and a BI, and may include a BI selected on the basis of a beam quality.

At operation 713, the terminal may report the measurement result of the first type RS to the base station. The terminal may measure the RS and report the measurement result to the base station. The measurement result may be beam information. The beam information may include a beam identifier, which may be a BI. The beam information may be information about any one of beams or information about a plurality of beams.

At operation 721, the terminal may measure the first type RS. At operation 723, the terminal may report the measurement result of the first type RS to the base station. This operation 723 corresponds to the above-described operation 713.

At operation 731, the second type RS may be triggered. After k subframes from the trigger of the second type RS, the terminal may measure the second type RS at operation 733. At operation 735, the terminal may report the measurement result of the second type RS to the base station. The measurement result may be beam information, which may include BI information.

At operation 741, the terminal may measure the first type RS. At operation 743, the terminal may report the measurement result of the first type RS to the base station.

As discussed above, the measurement and report of the first type RS and the measurement and report of the second type RS may be performed, and the BI may be reported as the measurement information.

When the terminal feeds back beam information to the base station, the terminal may determine the reported beam information as a beam to be used in communication with the base station. The base station may identify the received beam information and determine the corresponding beam as a beam to be used in communication with the terminal. For example, if the terminal reports the beam measurement information at the n-th subframe, the terminal and the base station may perform communication by using an updated beam from the (n+k)-th subframe.

In another embodiment, the terminal may report information about BQI to the base station. The terminal may report BQI regarding at least one or more beams. The base station may select a beam, based on BQI information received from the terminal. The base station may transmit information about the selected beam to the terminal. The beam update may be performed, based on the beam selection by the base station and the reception of information about beam by the terminal. For example, the base station may transmit an identifier about a beam, determined by the base station, to the terminal through the PDCCH. For example, the base station may transmit an identifier (Tx beam ID) of the base station Tx beam through the PDCCH. The terminal may receive the identifier of the base station Tx beam at the n-th subframe and then perform communication with the base station by using an updated beam from the (n+k)-th subframe. An unknown quantity k may be provided to the terminal, using an upper layer signal or DCI or in accordance with the definition of specification.

Figure 8:
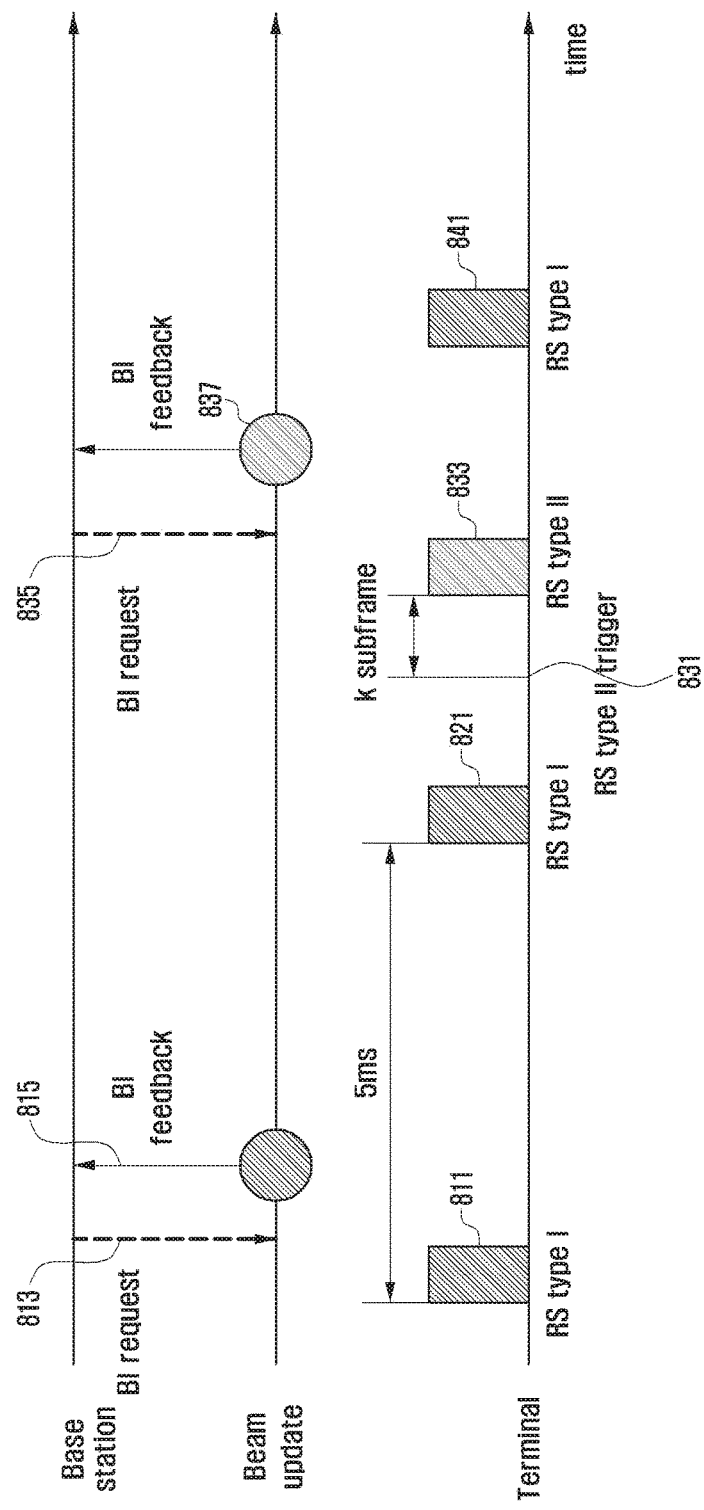
FIG. 8 is a diagram illustrating a method for feedback of beam information at the request of a base station according to an embodiment of the present disclosure.

FIG. 8 is a diagram illustrating a method for feedback of beam information at the request of a base station according to an embodiment of the present disclosure.

In an embodiment of FIG. 7 the terminal reports the beam measurement result at a given time point after the beam measurement, whereas in an embodiment of FIG. 8 the terminal may report the measurement result of RS to the base station when there is a request of the base station to report the beam measurement result. The FIG. 8 embodiment has an advantage of reducing the feedback overhead of the terminal in comparison with the FIG. 7 embodiment.

Referring to FIG. 8, at operation 811, the terminal may measure the first type RS. The terminal may measure a beam quality. As discussed in FIG. 7, the terminal may measure a beam.

At operation 813, the base station may send a request for a beam measurement result report to the terminal. When there is a need of beam change or beam measurement result, the base station may transmit the request for the beam measurement result report to the terminal. The base station may determine, based on channel state information (CSI) received from the terminal, whether the beam measurement result is needed. The CSI may include a channel quality indicator (CQI). The base station may determine a need of beam change or beam measurement result by comparing the CQI (or modulation and coding scheme (MCS) level) received from the terminal with the CQI (or MCS level) previously received from the terminal. Also, the base station may determine a need of beam change when the CQI received from the terminal is lower than a predetermined threshold. Also, the base station may determine a need of beam change on the basis of Ack/Nack information received from the terminal. For example, if Nack continues for a given time, the base station may determine that a beam change is needed. As discussed above, if there is a need of beam change, the base station may request the terminal to report the beam measurement result.

At operation 815, the terminal may report the beam measurement result to the base station. Namely, in response to the request of beam measurement result report received at operation 813, the terminal may report the beam measurement result at operation 815. BI information, BQI information, or the like may be reported as the beam measurement result.

At operation 821, the terminal may measure the first type RS. The terminal may measure a beam quality. Although measuring the first type RS at operation 821, the terminal does not report the beam measurement result to the base station because a request for beam measurement report is not received from the base station. In another embodiment, if there is no request for beam measurement report, the terminal may store the beam measurement result. Thereafter, when a request for beam measurement report is received, the terminal may report such stored information as well as a measurement result of the RS received just before the request.

At operation 831, the second type RS may be triggered. After k subframes from the trigger of the second type RS, the terminal may measure the second type RS at operation 833.

At operation 835, the base station may transmit a request for beam measurement result report to the terminal. If it is determined that there is a need of beam change or beam measurement result, the base station may request the terminal to report the beam measurement result. Details refer to the above-discussed operation 813. At operation 837, the terminal may report the measurement result of the second type RS to the base station. The measurement result may be beam information, which may be a BI.

At operation 841, the terminal may measure a beam.

In another embodiment, the terminal may determine, using BQI, that there is a need of beam change. Specifically, the terminal may measure BQI_RS type I and/or BQI_RS type II and then, based on the measurement result, determine that a beam change is needed. If there is a need of beam change, the terminal may feedback beam information. For example, using Equation 3 or 4, the terminal may determine whether a beam change is needed.

Equation 3 is used for determining, using BQI of the first type RS, whether to change a beam.

$$|BQI_{RStypeI}(n) - BQI_{RStypeI}(n-1)| > x \qquad \text{Equation 3}$$

The unknown x may be a predetermined value and may be set through an upper layer signal, DCI, or the like.

$BQI_{RStypeI}(n)$ denotes the n-th measured BQI for the first type RS by the terminal, and $BQI_{RStypeI}(n-1)$ denotes the (n−1)-th measured BQI for the first type RS by the terminal.

Comparing the (n−1)-th measured BQI value with the n-th measured BQI value according to Equation 3, the terminal may determine a need of beam change when a difference between both values exceeds the predetermined value x. Then the terminal may transmit beam information to the base station. In this manner, the terminal may perform beam feedback. Based on the beam feedback, the terminal and the base station may update a beam and perform a beam change.

In Equation 3, the BQI may be a BQI value of a beam corresponding to a currently used serving beam.

Equation 4 is used for determining, using BQI of the second type RS, whether to change a beam.

$$|BQI_{RStypeII}(n) - BQI_{RStypeII}(n-1)| > y \qquad \text{Equation 4}$$

The unknown y may be a predetermined value and may be set through an upper layer signal, DCI, or the like. The unknown values x and y may be the same values.

$BQI_{RStypeII}(n)$ denotes the n-th measured BQI for the second type RS by the terminal, and $BQI_{RStypeII}(n-1)$ denotes the (n−1)-th measured BQI for the second type RS by the terminal.

Comparing the (n−1)-th measured BQI value with the n-th measured BQI value according to Equation 4, the terminal may determine a need of beam change when a difference between both values exceeds the predetermined value y. Then the terminal may transmit beam information to the base station. In this manner, the terminal may perform beam feedback. Based on the beam feedback, the terminal and the base station may update a beam and perform a beam change.

When at least one condition of Equations 3 and 4 is satisfied, the terminal may feedback information about a beam having better BQI quality between the first type RS and the second type RS.

Alternatively, when both of Equations 3 and 4 are satisfied, the terminal may feedback information about a beam having better BQI quality between the first type RS and the second type RS.

In Equation 4, the BQI may be a BQI value of a beam corresponding to a currently used serving beam.

In another embodiment, the terminal may maintain a currently used beam for a given time.

Equation 5 is used for determining, using BQI of the first type RS, whether to change a beam.

$$|BQI_{RStypeI}(n) - BQI_{RStypeI}(n-1)| < x \qquad \text{Equation 5}$$

The unknown x may be a predetermined value and may be set through an upper layer signal, DCI, or the like. The unknown x may be equal to or different from that of Equation 3.

Comparing the (n−1)-th measured BQI value with the n-th measured BQI value according to Equation 5, the terminal may determine that there is no need of beam change when a difference between both values is smaller than the predetermined value x. Then the terminal may maintain a currently used beam for a given time q. This value q may be set through an upper layer signal, DCI, or the like and may be referred to as a beam coherence time. After the given time q, the terminal may transmit beam information or determine again whether a beam change is needed. If a condition for beam report is satisfied, the terminal may perform beam feedback. Based on the beam feedback, the terminal and the base station may update a beam and perform a beam change.

In Equation 5, the BQI may be a BQI value of a beam corresponding to a currently used serving beam.

Equation 6 is used for determining, using BQI of the second type RS, whether to change a beam.

$$|BQI_{RStypeII}(n) - BQI_{RStypeII}(n-1)| < y \qquad \text{Equation 6}$$

The unknown y may be a predetermined value and may be set through an upper layer signal, DCI, or the like. The unknown y may be equal to or different from that of Equation 4. Also, the unknown y may be equal to or different from the unknown x of Equation 5.

Comparing the (n−1)-th measured BQI value with the n-th measured BQI value according to Equation 6, the terminal may determine that there is no need of beam change when a difference between both values is smaller than the predetermined value y. Then the terminal may maintain a currently used beam for a given time q. This value q may be set through an upper layer signal, DCI, or the like. After the given time q, the terminal may transmit beam information or determine again whether a beam change is needed. If a condition for beam report is satisfied, the terminal may perform beam feedback. Based on the beam feedback, the terminal and the base station may update a beam and perform a beam change.

When at least one condition of Equations 5 and 6 is satisfied, the terminal may maintain a currently used beam. Namely, if the above condition is satisfied, the terminal may maintain a beam selected on the basis of the second type RS for a given time.

Alternatively, when both of Equations 5 and 6 are satisfied, the terminal may maintain a currently used beam. Namely, if the above condition is satisfied, the terminal may maintain a beam selected on the basis of the second type RS for a given time.

In Equation 6, the BQI may be a BQI value of a beam corresponding to a currently used serving beam.

In another embodiment, the terminal may compare a currently used beam with a beam selected through measurement of the first type RS and/or the second type RS. Namely, the terminal may perform measurement through beam sweeping for the RS transmitted periodically or aperiodically and then determine whether the best beam is identical with a current serving beam. If the best beam is not identical with the current serving beam, the terminal may determine a need of beam change and transmit the beam measurement result to the base station. Then the terminal and the base station may share the measurement result and perform a beam change and a beam update. If the best beam is identical with the current serving beam, the terminal may determine that there is no need of beam change. In this case, the terminal may not report the beam measurement result to the base station because of no need of beam change or report the beam measurement result to the base station regardless of a need of beam change.

Meanwhile, in embodiments of the present disclosure, it is possible to combine the above-discussed beam update methods. For example, it is possible to perform a beam update in a combination of different embodiments such as performing a beam feedback when a threshold condition considering a BCI value is satisfied and when there is a request for beam measurement information report from the base station.

Figure 9:
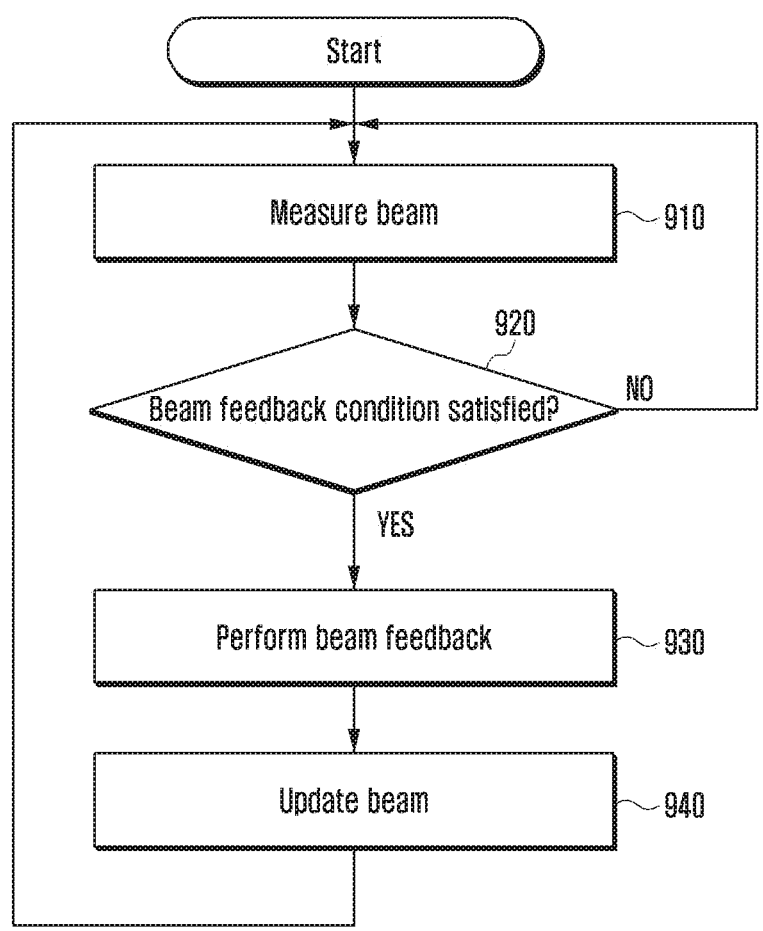
FIG. 9 is a diagram illustrating operations of a terminal according to an embodiment of the present disclosure.

FIG. 9 is a diagram illustrating operations of a terminal according to an embodiment of the present disclosure.

Referring to FIG. 9, at operation 910, the terminal may measure a beam. For example, the terminal may measure a beam RS, namely, the first RS and/or the second RS. The terminal may measure the beam RS through beam sweeping.

At operation 920, the terminal determines whether the measured beam satisfies a beam feedback condition. The beam feedback condition refers to the beam update methods discussed above.

The terminal may perform a beam feedback whenever measuring a beam or by determining whether there are instructions of the base station. The terminal may determine a beam feedback or not, based on a BQI value or by comparing a current serving beam with the measured beam. Namely, by applying various methods discussed above, the terminal may determine whether a beam feedback condition is satisfied.

If the beam feedback condition is not satisfied, the terminal continuously performs the beam measurement at operation 910. If the beam feedback condition is satisfied, the terminal performs a beam feedback to the base station at operation 930. Namely, the terminal may report the measurement result of the beam RS to the base station. The measurement result may include information about at least one beam. This information may include a BI and may further include a beam measurement value (e.g., BQI) corresponding to the BI. Using the PUCCH, the terminal may transmit the beam feedback information.

At operation 940, the terminal may update a beam. The base station may update a beam, based on the beam feedback from the terminal. The terminal may update a beam according to the beam measurement result or by receiving beam update information from the base station. The beam update information may include information about the Tx beam to be used by the base station. After receiving this information about the base station Tx beam, the terminal may update the terminal Rx beam corresponding to the base station Tx beam and use it in communication with the base station.

The information about the base station Tx beam may be received through the PDCCH. Assuming that the PDCCH is transmitted at the n-th subframe, the same Tx beam may be applied to the PDCCH and the PDSCH transmitted at the n-th subframe. The information about the base station Tx beam transmitted through the PDCCH may be information about the Tx beam for PDSCH reception at the (n+k)-th subframe. The terminal may detect the information about the base station Tx beam transmitted at the n-th subframe and use it for receiving the PDCCH/PDSCH with the Rx beam corresponding to the Tx beam of the base station at the (n+k)-th subframe.

As discussed above, the terminal may update a beam, and then the terminal and the base station may perform communication by using the updated beam.

Figure 10:
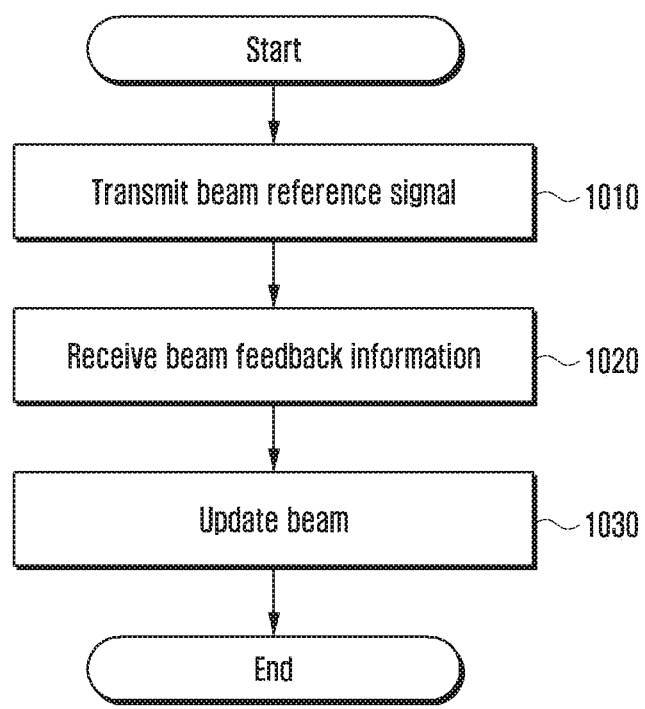
FIG. 10 is a diagram illustrating operations of a base station according to an embodiment of the present disclosure.

FIG. 10 is a diagram illustrating operations of a base station according to an embodiment of the present disclosure.

In this embodiment, the base station may set in advance a beam feedback condition or a condition for the terminal to transmit beam measurement information to the base station. For example, such a condition may be preset through an upper layer signaling, DCI, or the like.

Referring to FIG. 10, at operation 1010, the base station may transmit the RS for measuring a beam to the terminal. Namely, the base station may transmit the first RS and/or the second RS. The base station may transmit the RS for each beam through beam sweeping.

At operation 1020, the base station may receive beam feedback information from the terminal. Namely, if the beam feedback condition is satisfied, the terminal may perform a beam feedback to the base station, and then the base station may receive beam feedback information. In this case, the base station may transmit a request for beam feedback report or beam measurement information report to the terminal. In response to this request of the base station, the terminal may perform the beam feedback. The base station may set in advance parameters required for the terminal to determine a beam measurement condition. The beam feedback information may include a beam measurement result. The beam measurement result may include information about at least one beam. This information may include a BI and may further include a beam measurement value (e.g., BQI) corresponding to the BI. Using the PUCCH, the base station may receive the beam feedback information.

At operation 1030, the base station may update a beam, based on the beam feedback received from the terminal. Based on the beam feedback, the base station may select the base station Tx beam. Then the base station may transmit information about the base station Tx beam to the terminal by using the PDCCH. The terminal that receives the information about the base station Tx beam may update the terminal Rx beam.

The information about the base station Tx beam may be transmitted through the PDCCH. Assuming that the PDCCH is transmitted at the n-th subframe, the same Tx beam may be applied to the PDCCH and the PDSCH transmitted at the n-th subframe. The information about the base station Tx beam transmitted through the PDCCH may be information about the Tx beam for PDSCH transmission at the (n+k)-th subframe. The terminal may detect the information about the base station Tx beam transmitted at the n-th subframe and use it for receiving the PDCCH/PDSCH with the Rx beam corresponding to the Tx beam of the base station at the (n+k)-th subframe.

As discussed above, the base station may update a beam, and then the terminal and the base station may perform communication by using the updated beam.

Figure 11:
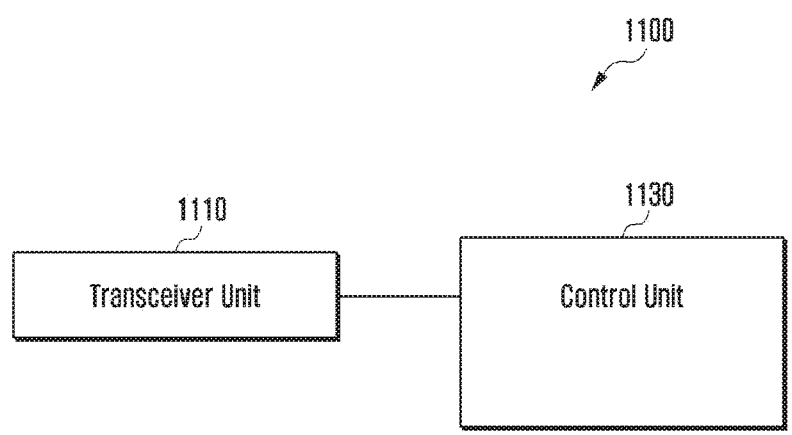
FIG. 11 is a diagram illustrating a terminal according to an embodiment of the present disclosure.

FIG. 11 is a diagram illustrating a terminal according to an embodiment of the present disclosure.

Referring to FIG. 11, a terminal 1100 may include a transceiver unit 1110 for transmitting and receiving a signal, and a control unit 1130. The terminal 1100 may transmit and/or receive a signal, information, message, and the like through the transceiver unit 1110. The control unit 1130 may control the overall operation of the terminal 1100. The control unit 1130 may include at least one processor. The control unit 1130 may control the terminal operation discussed above through FIGS. 1, 2, 3A to 3C, 4, 5, 6, 7, 8, 9, and 10.

According to embodiments of the present disclosure, the control unit 1130 may measure a beam RS transmitted from the base station and determine whether a beam measurement information transmission condition is satisfied. If the beam measurement information transmission condition is satisfied, the control unit 1130 may control the transceiver unit 1110 to transmit beam measurement information to the base station and to receive information about a base station Tx beam from the base station. Based on the information about the base station Tx beam, the control unit 1130 may update information about a terminal Rx beam.

Additionally, the control unit 1130 may measure the first type RS and also measure the second type RS in a region identified based on the measured first type RS.

Additionally, when a request for a beam measurement information report is received from the base station, the control unit 1130 may control the transceiver unit 1110 to transmit the beam measurement information.

Additionally, if an absolute value of a difference between beam quality information for the n-th beam RS and beam quality information for the (n−1)-th beam RS exceeds a predetermined threshold, the control unit 1130 may control the transceiver unit 1110 to report the beam measurement information.

Additionally, if an absolute value of a difference between beam quality information for the n-th beam RS and beam quality information for the (n−1)-th beam RS is smaller than a predetermined threshold, the control unit 1130 may control the transceiver unit 1110 not to transmit the beam measurement information for a given time.

Figure 12:
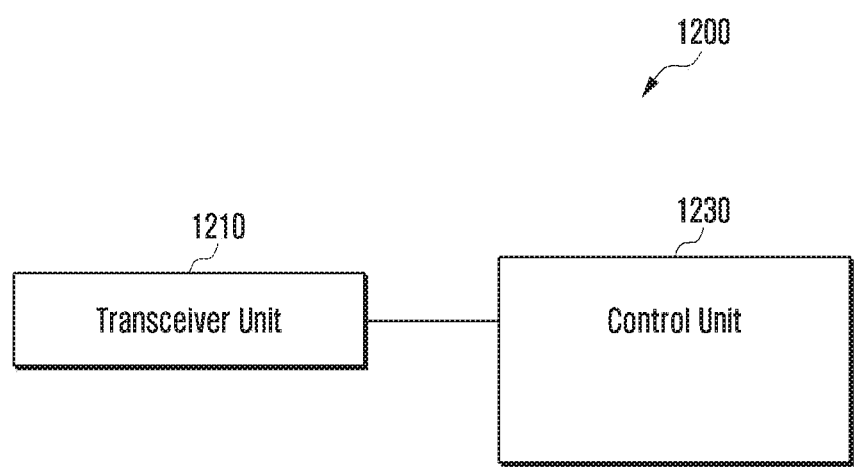
FIG. 12 is a diagram illustrating a base station according to an embodiment of the present disclosure.

FIG. 12 is a diagram illustrating a base station according to an embodiment of the present disclosure.

Referring to FIG. 12, a base station 1200 may include a transceiver unit 1210 for transmitting and receiving a signal, and a control unit 1230. The base station 1200 may transmit and/or receive a signal, information, message, and the like through the transceiver unit 1210. The control unit 1230 may control the overall operation of the base station 1200. The control unit 1230 may include at least one processor. The control unit 1230 may control the base station operation discussed above through FIGS. 1 to 10.

According to embodiments of the present disclosure, the control unit 1230 may set a beam measurement information transmission condition to the terminal. Also, the control unit 1230 may control the transceiver unit 1210 to transmit a beam RS to the terminal and to receive beam measurement information from the terminal. Based on the beam measurement information, the control unit 1230 may determine a base station Tx beam.

Additionally, the control unit 1230 may control the transceiver unit 1210 to receive measurement information of the first type RS from the terminal and to transmit the second type RS in a region identified based on the received measurement information of the first type RS.

Additionally, the control unit 1230 may control the transceiver unit 1210 to transmit, to the terminal, a message instructing the terminal to report the beam measurement information.

Additionally, if an absolute value of a difference between beam quality information for the n-th beam RS and beam quality information for the (n−1)-th beam RS exceeds a predetermined threshold, the control unit 1230 may instruct the terminal to report the beam measurement information.

Additionally, if an absolute value of a difference between beam quality information for the n-th beam RS and beam quality information for the (n−1)-th beam RS is smaller than a predetermined threshold, the control unit 1230 may instruct the terminal not to transmit the beam measurement information for a given time.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal, the method comprising:
    measuring a beam reference signal (BRS) transmitted from a base station;
    determining whether a beam measurement information transmission condition is satisfied;
    if the beam measurement information transmission condition is satisfied, transmitting beam measurement information to the base station;
    receiving information about a base station transmitting beam from the base station; and
    updating information about a terminal receiving beam based on the received information about the base station transmitting beam.

2. The method of claim 1, wherein the measuring of the BRS includes measuring a first type reference signal and measuring a second type reference signal in a region identified based on the measured first type reference signal.

3. The method of claim 1, further comprising:
    when a request for a beam measurement information report is received from the base station, transmitting the beam measurement information to the base station.

4. The method of claim 1, wherein the beam measurement information transmission condition includes instructing the terminal to report the beam measurement information if an absolute value of a difference between beam quality information for the n-th BRS and beam quality information for the (n−1)-th BRS exceeds a predetermined threshold.

5. The method of claim 1, wherein the beam measurement information transmission condition includes instructing the terminal not to report the beam measurement information for a given time if an absolute value of a difference between beam quality information for the n-th BRS and beam quality information for the (n−1)-th BRS is smaller than a predetermined threshold.

6. A terminal comprising:
    a transceiver configured to transmit or receive a signal; and
    at least one processor configured to:
        measure a beam reference signal (BRS) transmitted from a base station, to determine whether a beam measurement information transmission condition is satisfied,
        if the beam measurement information transmission condition is satisfied, transmit beam measurement information to the base station,
        receive information about a base station transmitting beam from the base station, and
        update information about a terminal receiving beam based on the received information about the base station transmitting beam.

7. The terminal of claim 6, wherein the at least one processor is further configured to:

measure a first type reference signal, and
measure a second type reference signal in a region identified based on the measured first type reference signal.

8. The terminal of claim 6, wherein the at least one processor is further configured to, when a request for a beam measurement information report is received from the base station, transmit the beam measurement information to the base station.

9. The terminal of claim 6, wherein the beam measurement information transmission condition includes instructing the terminal to report the beam measurement information if an absolute value of a difference between beam quality information for the n-th BRS and beam quality information for the (n−1)-th BRS exceeds a predetermined threshold.

10. The terminal of claim 6, wherein the beam measurement information transmission condition includes instructing the terminal not to report the beam measurement information for a given time if an absolute value of a difference between beam quality information for the n-th BRS and beam quality information for the (n−1)-th BRS is smaller than a predetermined threshold.

\* \* \* \* \*